(12) United States Patent
Larsson et al.

(10) Patent No.: US 9,266,244 B2
(45) Date of Patent: Feb. 23, 2016

(54) METHOD AND A CONTACT PANEL HAVING CONTACTS PROTRUDING THROUGH AN OPENING IN A COVER FORMING PART OF AN INDUSTRIAL ROBOT

(75) Inventors: Jan Larsson, Västerås (SE); Karl-Gunnar Johnsson, Västerås (SE); Mats Olsson, Västerås (SE); Bo Toresson, Köping (SE); Stig Persson, Västerås (SE); Tommi Paananen, Västerås (SE)

(73) Assignee: ABB AB, Västerås (SE)

( * ) Notice: Subject to any disclaimer, the term of this patent is extended or adjusted under 35 U.S.C. 154(b) by 2037 days.

(21) Appl. No.: 11/883,888

(22) PCT Filed: Feb. 13, 2006

(86) PCT No.: PCT/SE2006/000201
§ 371 (c)(1),
(2), (4) Date: Aug. 8, 2007

(87) PCT Pub. No.: WO2006/085823
PCT Pub. Date: Aug. 17, 2006

(65) Prior Publication Data
US 2008/0156137 A1 Jul. 3, 2008

(30) Foreign Application Priority Data
Feb. 11, 2005 (SE) ...................... 0500338

(51) Int. Cl.
*B25J 19/00* (2006.01)

(52) U.S. Cl.
CPC .......... *B25J 19/0025* (2013.01); *B25J 19/0075* (2013.01); *Y10T 74/20311* (2015.01)

(58) Field of Classification Search
CPC .............. B25J 19/0025; B25J 19/0075; Y10T 74/20311

USPC ........ 74/490.01–490.05; 174/53, 59, 60, 527; 901/28, 50; 200/51.09, 293, 296; 248/49, 65, 68.1; 220/242, 3.3, 3.92
See application file for complete search history.

(56) References Cited

U.S. PATENT DOCUMENTS 3,596,019 A * 7/1971 Koester ................ 200/51.09
4,047,448 A * 9/1977 Pardo et al. ................ 74/417
(Continued)

FOREIGN PATENT DOCUMENTS

EP  0299083 A1  1/1989
EP  1145808 A2  10/2001
(Continued)

OTHER PUBLICATIONS

PCT/ISA/210—International Search Report—May 31, 2006.
(Continued)

*Primary Examiner* — Alan B Waits
(74) *Attorney, Agent, or Firm* — Venable LLP; Eric J. Franklin

(57) ABSTRACT

An industrial robot including a contact panel having one or several contacts to allow connection to the industrial robot of one or several cables through which energy, signals or a substance may pass to and/or from the industrial robot. A cover forms part of an outer surface of the industrial robot. Each one of the one or several contacts of the contact panel protrudes through an opening in the cover so as to be accessible from the outside of the industrial robot. The contact panel is mounted to and supported by a holder that is secured in an internal cavity of the industrial robot so as to allow the contact panel to be held in place in the industrial robot when the cover is removed.

8 Claims, 2 Drawing Sheets

(56) References Cited

U.S. PATENT DOCUMENTS

| | | | |
|---|---|---|---|
| 4,969,795 A * | 11/1990 | Toyoda et al. | 414/744.2 |
| 5,012,043 A * | 4/1991 | Seymour | 174/57 |
| 5,256,076 A * | 10/1993 | Hamlin | 439/188 |
| 6,279,413 B1 | 8/2001 | Terada et al. | |
| 6,468,107 B1 * | 10/2002 | Nice et al. | 439/536 |
| 6,530,806 B2 * | 3/2003 | Nelson | 439/528 |
| 6,622,585 B1 * | 9/2003 | Salomonsson et al. | 74/490.02 |
| 6,644,986 B1 * | 11/2003 | Wilker, Sr. | 439/106 |
| 6,875,937 B1 * | 4/2005 | Saviano | 200/297 |
| 6,940,015 B2 * | 9/2005 | Fang | 174/53 |
| 2003/0089710 A1 * | 5/2003 | Gates, II | 220/3.92 |
| 2003/0226940 A1 | 12/2003 | Karlinger | |

FOREIGN PATENT DOCUMENTS

| | | | | |
|---|---|---|---|---|
| JP | 02100892 A | * | 4/1990 | ............... B25J 19/00 |
| JP | 04-315592 A | | 11/1992 | |
| JP | 05-138581 A | | 6/1993 | |
| JP | 07-124887 A | | 5/1995 | |
| JP | 2002-239969 A | | 8/2002 | |

OTHER PUBLICATIONS

PCT/ISA/237—Written Opinion of the International Searcing Authority—May 31, 2006.

* cited by examiner

METHOD AND A CONTACT PANEL HAVING CONTACTS PROTRUDING THROUGH AN OPENING IN A COVER FORMING PART OF AN INDUSTRIAL ROBOT

CROSS-REFERENCE TO RELATED APPLICATIONS

This application claims priority to Swedish patent application 0500338-9 filed 11 Feb. 2005 and is the national phase under 35 U.S.C. §371 of PCT/SE2006/000201 filed 13 Feb. 2006.

TECHNICAL FIELD OF THE INVENTION AND PRIOR ART

The present invention relates to an industrial robot. The invention also relates to a method for providing an industrial robot with means to allow the connection to the industrial robot of one or several cables through which energy, signals or a substance may pass to and/or from the industrial robot.

The expression "cable" as used in this description and the subsequent claims refers to an elongated member, such as a wire, a fibre, a pipe or a tube, that is capable of transmitting energy, such as electricity, or a signal, such as an electric or optic signal, or conveying a substance, such as gas or coolant, between two points.

An industrial robot comprises a plurality of cables connected to different components of the industrial robot, for instance to provide power to the industrial robot and an associated robot tool, to transmit communication signals to and from sensors and control systems and to supply pressurized gas or coolant to certain parts of the industrial robot. These cables are often guided internally through the industrial robot so as to protect the cables from damage that may occur during the operation of the industrial robot.

The internal cables of the industrial robot sometimes need to be accessed in order to connect external cables or equipment thereto, for instance in order to provide electricity or coolant to a robot tool or to monitor signals transmitted through the robot. Accessing the internal cables of the industrial robot and making connections thereto may however be problematic.

U.S. Pat. No. 6,279,413 A discloses an articulated industrial robot that has a robot arm provided with a detachable cover so as to allow access to internal equipment of the industrial robot.

An industrial robot according to the preamble of claim 1 is previously known from JP 7124887 A.

SUMMARY OF THE INVENTION

The object of the present invention is to provide a simple and cost-effective way of accessing the internal cables of an industrial robot and making connections thereto.

The contacts of the contact panel are accessible from the outside of the robot without any part of the robot having to be disassembled, moved or removed. Furthermore, no special tools are required to access the contacts, and the connection and disconnection of cables and equipment to/from the robot is facilitated. Owing to the fact that the contact panel is mounted to and supported by a holder that is separated from the cover, the contact panel may be mounted to and held in place in the industrial robot in its final position before the cover has been mounted to the industrial robot and if the cover is removed after the initial assembling of the industrial robot. This will facilitate the work associated with the assembling of the industrial robot.

The contact panel is with advantage used as an interface for customer-specified applications, e.g. in order to supply energy to a specific robot tool, to transmit control signals to the robot tool, to transmit signals from sensors associated with the robot tool and/or to convey a substance, such as gas or coolant, to the robot tool. In this case, the power cables and signal transmitting cables associated with the ordinary components of the industrial robot, such as the motors of the robot arms, are suitably drawn into the industrial robot at a location separated from the contact panel. Hereby, the adaptation of the industrial robot to the specific needs and requirements of the individual customer will be facilitated and it will also be easier for the customer to make modifications to the industrial robot when need arises, e.g. when the robot tool is to be exchanged for another type of robot tool.

According to an embodiment of the invention, the contact panel is removably mounted to the holder. This allows the contact panel to be easily exchanged when a different contact panel is required for a particular application.

According to another embodiment of the invention, the cover is arranged to provide a fluid-tight fit with the adjacent sections of the outer surface of the industrial robot and with the contact panel or its contact/contacts. This facilitates the cleaning of the outer surface of the industrial robot and its use in any application in which fluid may leak into the industrial robot.

According to another embodiment of the invention, the cover is arranged to cover an opening in the industrial robot that is larger than the outwardly facing surface of the contact panel so as to allow access via the opening to internal parts of the industrial robot when the contact panel is mounted to the industrial robot via the holder and the opening is uncovered, i.e. when the cover is removed from said opening. Hereby, internal parts and components of the industrial robot located behind the contact panel may be easily accessed when the cover is removed and the contact panel is mounted on its intended place. This will facilitate the work associated with the assembling of the industrial robot as well as work associated with repair and maintenance thereof.

Further advantages as well as advantageous features of the inventive industrial robot will appear from the following description.

The present invention also relates to a method for providing an industrial robot with means to allow the connection to the industrial robot of one or several cables through which energy, signals or a substance may pass to and/or from the industrial robot. According to the inventive method:

a contact panel, which is provided with one or several contacts to be connected to said one or several cables, is mounted to the industrial robot via a holder that is secured in an internal cavity of the industrial robot, the contact panel being supported by the holder and being accessible via an opening in the outer surface of the industrial robot; whereupon in a subsequent step, a cover is made to cover said opening so as to form part of the outer surface of the industrial robot, each one of said one or several contacts of the contact panel being arranged to protrude through an opening in the cover so as to be accessible from the outside of the industrial robot.

BRIEF DESCRIPTION OF THE DRAWINGS

With reference to the appended drawings, a specific description of preferred embodiments of the invention cited as examples follows below. In the drawings.

DETAILED DESCRIPTION EMBODIMENTS OF THE INVENTION

Figure 1:
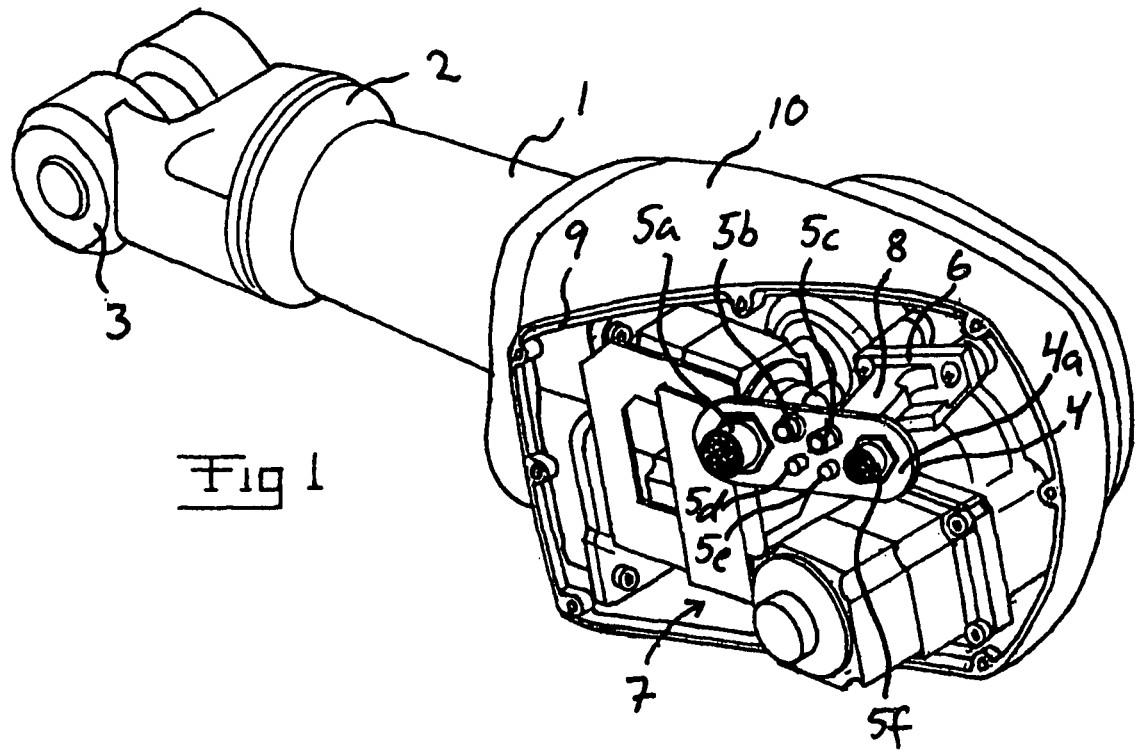
FIG. 1 is a schematic perspective view of an upper arm of an industrial robot according to an embodiment of the present invention, with the area surrounding the contact panel uncovered.

FIG. 1 shows an upper arm 1 of an industrial robot in a partly disassembled state. A wrist 2 is mounted at the distal end of the upper arm 1. The wrist 2 comprises supporting means on which a tilt 3 is mounted. The tilt 3 is to carry a robot tool (not shown).

The upper arm 1 is provided with a contact panel 4 having contacts 5a-5f to allow the connection to the industrial robot of one or several cables through which energy, signals or a substance may pass to and/or from the industrial robot. The contact panel 4 is mounted to and supported by a holder 6 that is secured in an internal cavity 7 of the upper arm 1. The holder 6 is mounted to an internal body of the upper arm 1. The contact panel 4 is with advantage removably mounted to the holder 6, by screws or any other suitable fastening means. In the illustrated embodiment the holder 6 comprises a support arm 8, the contact panel 4 being mounted to an outer end of the support arm.

The contacts 5a-5f of the contact panel are connected to cables (not shown) arranged inside the upper arm 1.

Figure 2:
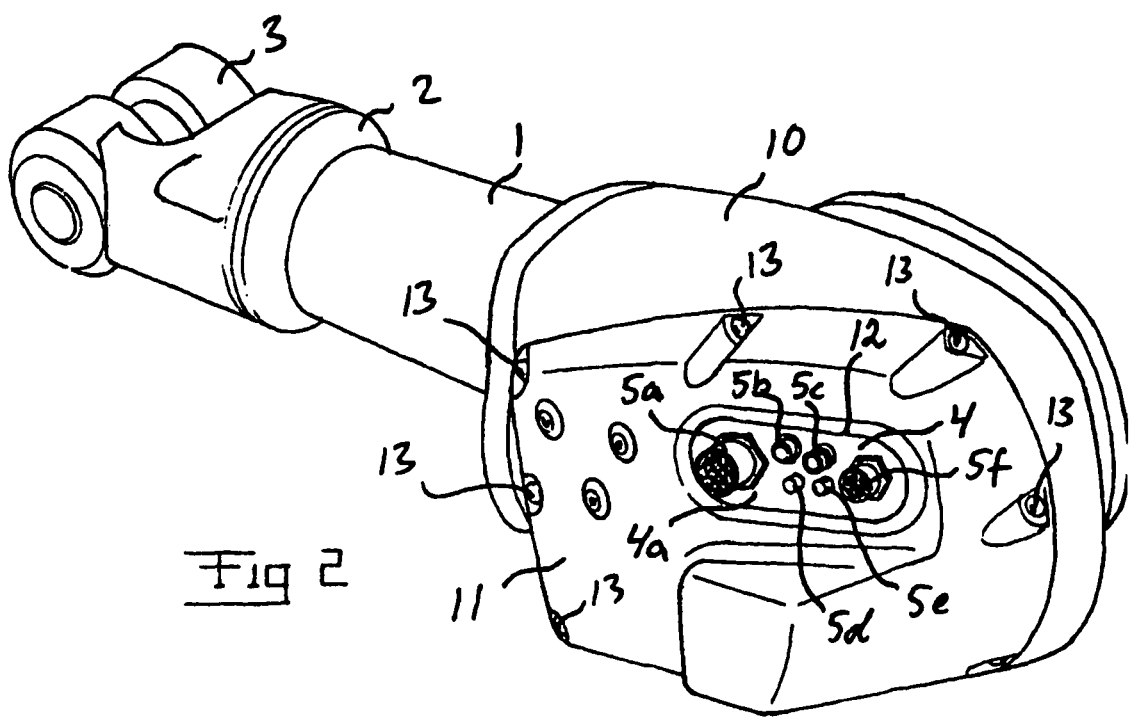
FIG. 2 shows the upper arm of FIG. 1, with the area surrounding the contact panel covered.

The opening 9 in the outer surface 10 of the upper arm surrounding the contact panel 4 is in the assembled state of the upper arm 1 covered by a cover 11, as illustrated in FIG. 2. The cover 11 forms part of the outer surface 10 of the upper arm 1.

The contacts 5a-5f of the contact panel 4 protrude through an opening 12 in the cover 11 so as to be accessible from the outside of the upper arm when assembled. The cover 11 is suitably removably mounted to the upper arm 1, by screws 13 or any other suitable fastening means.

The cover 10 may be provided with one opening 12 for receiving all the contacts of the contact panel, as illustrated in FIG. 2. Alternatively, the cover may be provided with several openings for receiving different contacts of the contact panel.

The above-mentioned opening 9 in the upper arm is larger than the outwardly facing surface 4a of the contact panel 4 so as to allow access via the opening 9 to internal parts of the upper arm when the contact panel 4 is mounted to the industrial robot via the holder 6 and the opening 9 is uncovered, as illustrated in FIG. 1.

The contact panel 4 is held in place on its intended location in the upper arm 1 by the holder 6 also when the cover 11 is removed from the opening 9, as illustrated in FIG. 1.

The cover 11 is suitably arranged to provide a fluid-tight fit with the adjacent sections of the outer surface 10 of the upper arm 1 and with the contact panel 4. This is accomplished by means of seals located between the cover 11 and the rim of the opening 9 in the outer surface of the upper arm 1 and between the contact panel 4 and the rim of the opening 12 in the cover 11.

A detachable adapter, plug or shield to insert into, or shield the contacts of the contact panel may be provided. One or more contacts may thereby be covered when not in use or when the industrial robot is being cleaned or used in an environment which might damage the contacts in some way.

Figure 3:
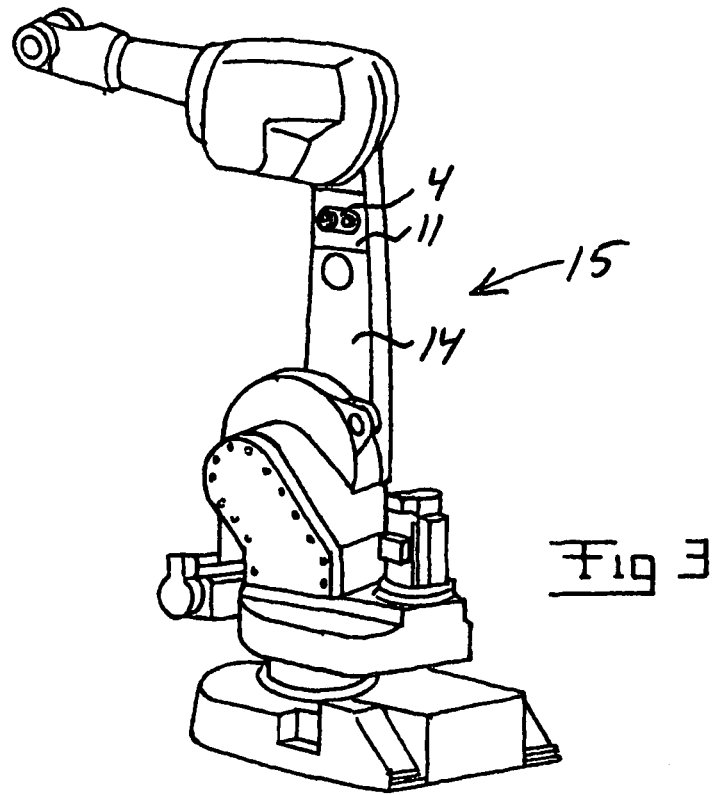
FIG. 3 is a schematic perspective view of an industrial robot according to a second embodiment of the invention.

In the embodiment illustrated in FIG. 3, the contact panel 4 and the associated cover 11 are mounted to a lower arm 14 of an industrial robot 15, the cover forming part of the outer surface of the lower arm.

Figure 4:
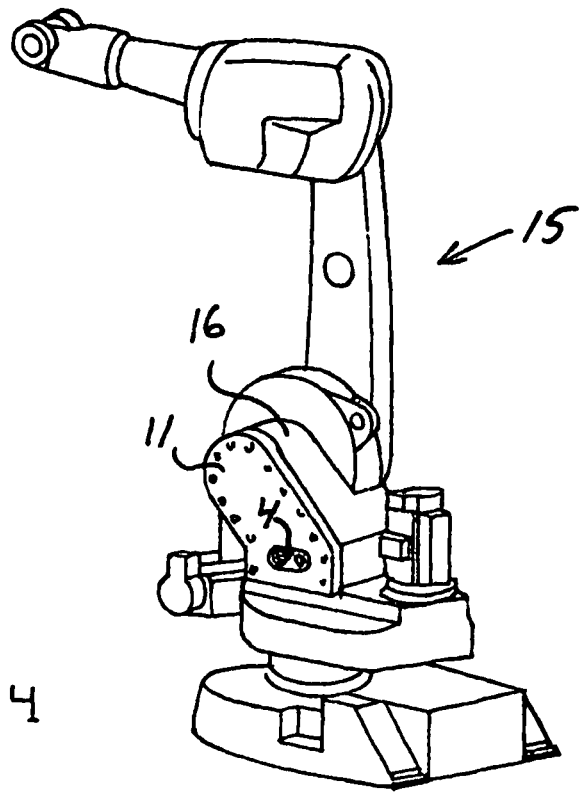
FIG. 4 is a schematic perspective view of an industrial robot according to a third embodiment of the invention.

In the embodiment illustrated in FIG. 4, the contact panel 4 and the associated cover 11 are mounted to the base 16 of an industrial robot 15, the cover forming part of the outer surface of the base.

According to the inventive method, the contact panel 4 is mounted to the industrial robot via the holder 6 when the associated opening 9 in the outer surface of the industrial robot is uncovered, i.e. when said opening 9 is not covered by the above-indicated cover 11. Thereafter, the cover 11 is made to cover said opening 9 so as to form part of the outer surface 10 of the industrial robot. The contacts 5a-5f of the contact panel 4 are made to protrude through the opening 12 in the cover 11 so as to be accessible from the outside of the industrial robot when the opening 9 is covered by the cover 11.

An industrial robot according to the present invention is suitable for use in hygienic, hazardous and underwater environments since the robot housing may be arranged to be fluid-tight. Furthermore, the inventive industrial robot is suitable for use in confined environments since the contact panel is incorporated inside an internal cavity in the industrial robot, which reduces space requirements and results in a compact and slim-line structure of the robot housing.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. An industrial robot, comprising:
   a contact panel having at least one contact to allow connection to the industrial robot of at least one cable which permit energy, signals or a substance to pass to and/or from the industrial robot;
   a cover forming part of an outer surface of the industrial robot, wherein the cover is removably mounted to the industrial robot, and wherein each one of said at least one contact of the contact panel protrudes through an opening in the cover so as to be accessible from outside of the industrial robot; and
   a holder to which the contact panel is mounted and which supports the contact panel, wherein the holder is secured in an internal cavity of the industrial robot so as to allow the contact panel to be held in place in the industrial robot by the holder when the cover is removed and when the cover is mounted to the industrial robot, wherein the cover is arranged to cover an opening in the industrial robot that is larger than an outwardly facing surface of the contact panel and when the cover is removed and the opening is uncovered access is provided via the opening to internal parts of the industrial robot.

2. The industrial robot according to claim 1, wherein the contact panel and the cover are mounted to an upper arm of the industrial robot.

3. The industrial robot according to claim 1, wherein the contact panel and the cover are mounted to a lower arm of the industrial robot.

4. The industrial robot according to claim 1, wherein the contact panel and the cover are mounted to a base of the industrial robot.

5. The industrial robot according to claim 1, wherein the contact panel is removably mounted to the holder.

6. The industrial robot according to claim 1, wherein the cover is arranged to provide a fluid-tight fit with adjacent sections of the outer surface of the industrial robot and with the contact panel or the at least one contact.

7. The industrial robot according to claim 1, wherein the holder comprises a support arm, and the contact panel is mounted to an outer end of the support arm.

8. A method for providing an industrial robot with connection to at least one cable which permit energy, signals or a substance to pass to and/or from the industrial robot, the method comprising:
  mounting a contact panel, which is provided with at least one contact to be connected to said at least one cable, to the industrial robot via a holder that is secured in an internal cavity of the industrial robot, the contact panel being supported by the holder and being accessible via an opening in the outer surface of the industrial robot that is larger than an outwardly facing surface of the contact panel;
  covering the opening with a cover so as to form part of the outer surface of the industrial robot, each one of said at least one contact of the contact panel being arranged to protrude through the opening in the cover so as to be accessible from the outside of the industrial robot; and
  uncovering the opening by removing the cover, thereby providing access via the opening to internal parts of the industrial robot, wherein the holder holds the contact panel in place in the industrial robot when the cover is removed.

* * * * *